Nov. 8, 1960  C. M. BARNES ET AL  2,959,190
CONTROL VALVE HAVING OPERATING POSITION HOLD
Filed Feb. 25, 1957  3 Sheets-Sheet 1

INVENTORS
CHARLES M. BARNES
JAMES R. CHAPMAN, JR.
RICHARD L. LEWIS
BY William P. Hickey
ATTORNEY

INVENTOR.
CHARLES M. BARNES
JAMES R. CHAPMAN, JR
RICHARD L. LEWIS
BY William P. Hickey
ATTORNEY United States Patent Office 2,959,190
Patented Nov. 8, 1960

2,959,190

CONTROL VALVE HAVING OPERATING POSITION HOLD

Charles M. Barnes, James R. Chapman, Jr., and Richard L. Lewis, St. Joseph, Mich., assignors to The Bendix Corporation, a corporation of Delaware Filed Feb. 25, 1957, Ser. No. 641,919

17 Claims. (Cl. 137—622.5)

The present invention relates to control valves for fluid pressure motors; and more particularly to the type of hydraulic control valve which will hold itself in its motor actuating position once placed there until the movable element of the controlled motor reaches the end of its travel, or is otherwise stopped. The advantage of such a control device is of course that the attention of an operator is freed from the controlled device after he has initiated a course of action, such that he need not close the control valve when the course of action is completed.

There have been valves of the above type prior to applicant's invention. Some of these valves have employed a separate auxiliary stream of fluid, apart from that actually used to actuate the controlled motor, to hold the valve in its motor actuating position. This of course produces a continuous waste of energy. Still other control valves of this type have produced back pressures upon the controlled devices which hinder their satisfactory performance under certain conditions.

An object of the present invention is the provision of a new and improved control valve of the above described type which can be used with single acting cylinders that are not under load during their return stroke.

Another object of the invention is the provision of a new and improved control valve of the above described type which can be used without modification for the control of either a double acting fluid pressure motor, or a single acting fluid pressure motor.

Another object of the invention is the provision of a new and improved control valve of the above described type having two distinct stages of operation: a first in which low fluid flow rates can be delivered to the controlled motor without causing the valve to be held in its actuating position, and a second stage in which larger flow rates are delivered to the controlled motor, and in which the valve holds itself in its actuating position—the valve further including means which definitely indicates to the operator the point at which his control movement is approaching the second stage position of the control valve.

A further object of the invention is the provision of a new and improved control valve which holds itself in its motor actuating position by means of pressure differential produced by throttling of the main pressure supply stream to the controlled motor, the control valve having means which will provide the necessary pressure differential at a predetermined low flow rate and which will prevent the pressure differential from increasing appreciably above said predetermined pressure differential at flow rates above said predetermined flow rates.

The invention resides in certain constructions, and combinations and arrangements of parts and further objects and advantages will become apparent to those skilled in the art to which the invention relates from the following description of the preferred embodiment described with reference to the accompanying drawings forming part of the present specification, and in which:

The control valve shown in the drawings is specifically designed to be mounted upon a farm tractor as part of its hydraulic system for controlling integrally connected and/or detachable power accessories such as power lifts and the like. Some of the equipment which a farmer uses may be actuated by a single acting hydraulic cylinder, while others may be actuated by double acting hydraulic cylinders. The valve is constructed and arranged to automatically "hold" itself in its motor actuating position once placed there by the operator until the controlled motor (single or double acting) reaches the end of its travel. The valve also provides a first stage of motor control during which small flows may be delivered to the motor to "inch" the motor into its desired position without having the valve go into its automatic hold condition.

The valve shown generally comprises, a body member A having a longitudinally extending chamber or bore 10 in which is positioned a movable control member B for controlling flow to and from a pair of motor ports 12 and 14. Lock valve structure C is provided intermediate the motor ports 12 and 14 and the control member B for preventing unwanted return flow or leakage from the controlled fluid pressure motors. Opposing fluid pressure motor means D is provided on opposite ends of the control member B for holding the control member in its end positions when a predetermined pressure differential is applied thereto; and new and improved pressure differential producing means E is provided for supplying the predetermined pressure differential to the opposing motor means D at flow rates to the controlled devices above a predetermined rate.

Although the invention may be otherwise embodied it is shown herein as embodied in an open center valve. Flow from the tractor pump (not shown) is communicated to the pressure port 16 and is by-passed directly to a flow through port 18 when the control member B is in its center or normal position by means of annular recess 20 in the control member B, such that very little back pressure is created against the pump. The control member B is shiftable to first and second positions to the left of the center position shown in the drawing, and to third and fourth positions to the right of the shown center position. In all four positions, suitable land portions of the control member separate ports 16 and 18 to cause pressure to build up within the control valve.

Figure 4:
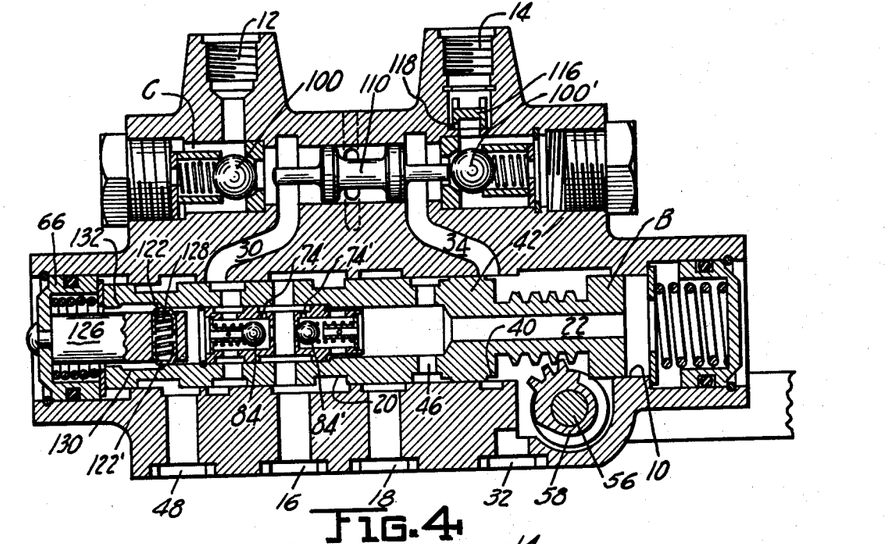
Figure 4 is a cross sectional view corresponding to Figure 2, but showing the valve in its first operating position.
Figure 5:
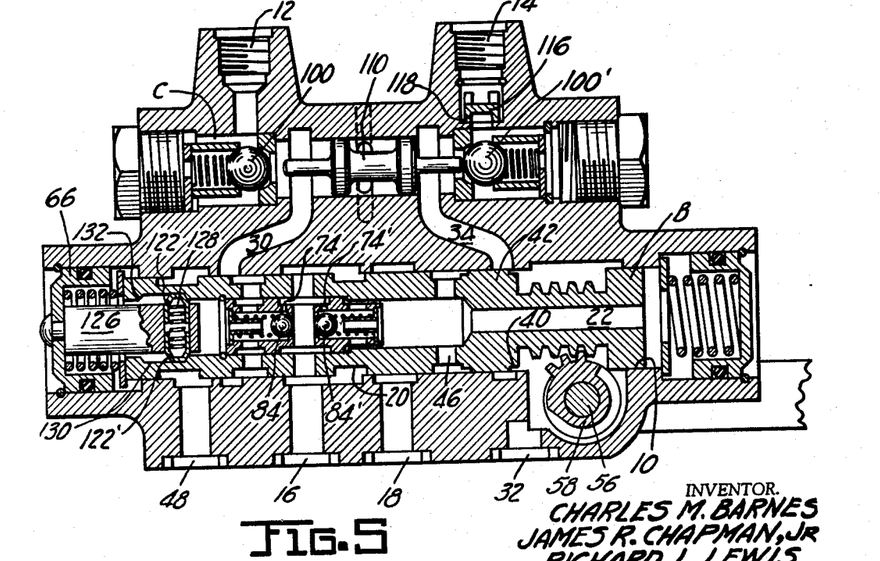
Figure 5 is a cross sectional view similar to Figure 4 but showing the valve in its second actuating position.

The control member B is provided with a longitudinally extending opening or passageway 22 communicating its opposite ends and a radial drilling 24 is adapted to communicate the pressure port 16 to the passageway 22 in all four positions of the control member by reason of an annular pressure groove 26 in the body member A. When the control member B is moved into its extreme left-hand or first position (shown in Figure 4), pressure from the longitudinally extending opening 22 is communicated to the motor port 12 by means of the pressure differential producing means E later to be described in detail, a second radial drilling 28 in the control member B, and an interconnecting passageway 30 in the body member A. Inasmuch as the control valve is adapted to be used for controlling a double acting cylinder, return flow from the motor port 14 is at the same time communicated with an exhaust port 32, through interconnecting passageway 34, an annular groove 36 in the control member and exhaust chamber 38 in the valve body. A throttling effect to the flow above described is achieved when the control member B is moved to its second position (spaced slightly to the right or toward neutral from the first position above described and as shown in Figure 5) by reason of a feathered edge or throttling groove 40 in the land 42 of the control member. When in this second position (shown in Figure 5), motor port 12 is in substantially unrestricted communication with the radial drilling 28 by reason of its associated annular groove 44; and the land 42 is moved to a position overlying the interconnecting passageway 34 wherein communication between it and the exhaust chamber 38 is confined to throttling groove 40.

Figure 1:
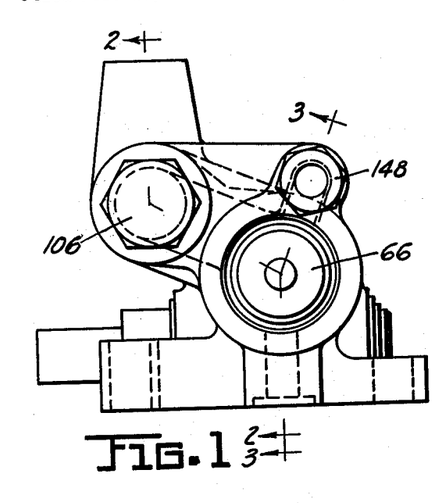
Figure 1 is an end view of a control valve embodying principles of the present invention.
Figure 2:
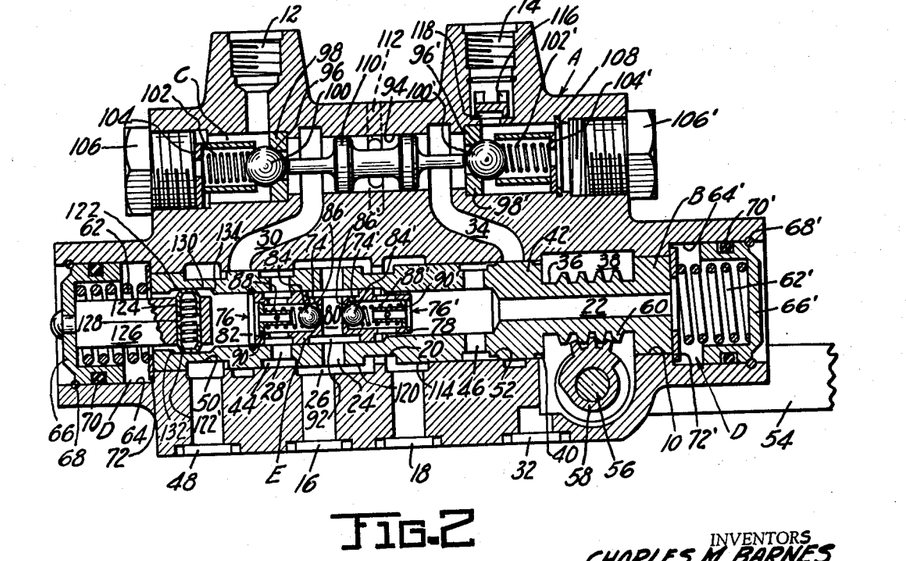
Figure 2 is a cross sectional view taken on the line 2—2 of Figure 1.
Figure 3:
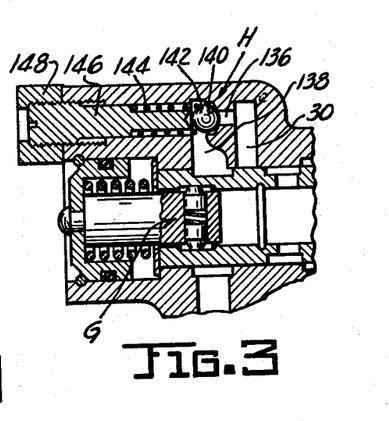
Figure 3 is a fragmentary sectional view taken on the lines 3—3 of Figure 1.
Figure 6:
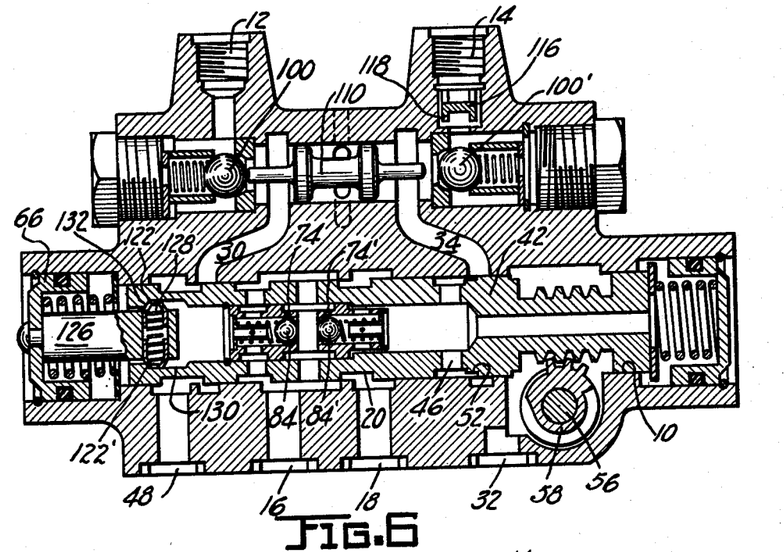
Figure 6 is a cross sectional view similar to Figure 4 but showing the valve in its third operating position.

In the fourth position of the valve (shown in Figure 7), the control member B is moved to an extreme right-hand position from the neutral position shown in Figure 2 of the drawing. In this position pressure flows from longitudinally extending opening 22 through a third radial drilling 46 to the interconnecting passageway 34; while return flow in the opposite interconnecting passageway 30 is communicated to another exhaust port 48 by means of annular groove 50 in the control member. Throttling of flow in this latter direction wherein flow proceeds out motor port 14 and in motor port 12 is produced in a third position (shown in Figure 6) of control member B between its neutral and fourth positions. In this third position, annular groove 50 still communicates interconnecting pasageway 30 with the exhaust port 48, but land 42 substantially closes off interconnecting passageway 34 excepting for the communication provided by a second feathered edge or throttling groove 52. The control member B is adapted to be moved into any of its positions by a control handle 54 on shaft 56 which extends through exhaust chamber 38 and is provided with a gear segment 58 in mesh with a rack 60 machined in the control member B.

The control member B is urged or biased into its center or neutral position (shown in Figure 2) by a pair of identical coil springs 62 and 62' positioned on either end of the control member. The coils springs are positioned in respective counterbores 64, 64' in opposite ends of the longitudinally extending chamber 10; and are held in place by similar end closure plates 66, 66' which in turn are retained in their counterbores by snap rings 68, 68' and are provided with suitable sealing means 70, 70'. The inner ends of coil springs 62, 62' abut washers 72, 72' which are prevented from exerting inward force upon the control member B beyond its neutral position by engagement with the bottom edge of their respective counterbores. The counterbores 64, 64' in their respective ends of the control member B in effect form the opposing fluid pressure motor means D previously indicated as being adapted to hold the control member B in either of its end positions (first and fourth) when a predetermined pressure differential is applied.

Pressure differential for the opposing motor means D is provided by pressure differential producing means E comprising a pair of orifices 74, 74', and back pressure valves 76, 76' positioned in a sleeve 78 in the longitudinal extending opening 22. The sleeve 78 is confined within a slight counterbore in the opening 22 by a snap ring 82, and is provided with a radial drilling 80 which is positioned between the respective orifices or drillings 74, 74' and back pressure valves 76, 76' and which communicates with the pressure port 16 in all four positions of the control member. The back pressure valves 76, 76' comprise a pair of oppositely facing valve seats 86, 86' which communicate with the radial drilling 80 and which are normally closed off by a pair of ball valves 84, 84' biased against the seats by means of oppositely acting coil springs 88, 88' retained in opposite ends of the sleeve 78 by flanged sleeves 90, 90' which are pressed into the opposite ends of the sleeve 78. The radial drilling 80 is intersected by an annular pressure groove 92 in its outer surface which groove 92 in turn intersects drillings 74 and 74'. Groove 92 overlies the back pressure valves 76, 76', and the orifices 74, 74' are formed by radial drillings positioned downstream of the valve seats 86, 86' such that the second and third radial drillings 28 and 46 are always in communication with the pressure port 16 through the orifices 74 and 74'. When the control member B is moved into its extreme left or first position, recess 44 will be in registry with the interconnecting passageway 30 while the radial drilling 46 is isolated by the sidewalls of the valve bore 10; and when the valve member B is in its extreme right hand or fourth position, radial drilling 46 will be in communication with innerconnecting passageway 34, while the recess 44 for the radial drilling 28 is isolated from the innerconnecting passageway 30 by the land portion of the spool B to the left of the recess 4. In the first position of the valve, therefore, flow proceeds from port 16 through drilling 80, orifice 74, drilling 28 to the innerconnecting passageway 30 while return flow through the innerconnecting passageway 34 passes through recess 36 and return port 32. At the same time pressure from the passageway 80 will pass through the orifice 74' through bore 22 to the right hand side of the control member B to supply full inlet pressure to the right hand side of the spool B while a reduced pressure as produced by the flow through the orifice 74 is communicated to the left end of the spool B. The valve and system which it operates, will normally be sized so that the flow through the orifice 74 will produce a sufficient pressure drop so that the pressure on the right hand of the spool B will be greater than the pressure on the left end of the spool B by an amount which will overcome the spring 62 to hold the spool in its first position. During large flow rates (as when little load is moved by the operated cylinder) back pressure valve 86 will open to prevent there being developed a reduced pressure in the left hand side of the spool appreciably below that required to hold it in its first position. Similarly, when the control member B is in its right hand or fourth position, radial drilling 46 will be communicated with the innercommunicating passage 34 while recess 50 is communicated with the innercommunicating passageway 30. In this position, pressure from the port 16 passes through radial drilling 80, through orifice 74' to the innercommunicating passageway 34, while return flow from the innercommunicating passageway 30 proceeds to the return port 48. In this instance full pressure is produced on the left end of the control member B while a reduced pressure is being produced on the right end of the control member B. Orifice 74' will normally be sized so that for normal operations the differential pressure produced by the orifice will be sufficient to hold the control member B in its right hand or fourth position and back pressure valve 84' is preferably constructed and sized in such a way so that it will open when flows in excess of this amount are required. The control member B will therefore be held in its end position until flow through the valve ceases.

The control valve also comprises lock valve structure C positioned between the motor ports 12 and 14 and the interconnecting passageways 30 and 34 to prevent backflow from the controlled device when the control member is in its neutral position. It will be remembered that in this neutral position flow from the pressure port 16 is communicated directly to the flow through port 18 by means of recess 20 without producing sufficient pressure within the valve to offset the pressure in the controlled device. The lock valve structure C is formed by means of a longitudinal bore 94 through the valve body A and comprises a pair of valve seats 96, 96' formed in annular members 98, 98' respectively positioned between the motor ports 12 and 14, and the interconnecting passageways 30 and 34 respectively. Ball valves 100, 100' are biased inwardly against their seats by coil springs 102, 102' which in turn are held in place by star shaped flanged sleeves 104, 104'. The left-hand sleeve 104 is held in place by a threaded plug 106, and the right-hand sleeve 104' is held in place by a snap ring 108. A removable plug 106' is also provided to close off the right-hand end of the bore 94. Between the ball valves 100 and 100' is a spool shaped piston 110 adapted to unlock or move one of the ball valves off its seat when pressure flow proceeds out through the other of the valves As for example when pressure is admitted to interconnecting passageway 30 to proceed out ball valve 100, the piston 110 is moved to the right to move ball valve 100' off its seat 96' to permit return flow from the controlled device. A stop 112 formed by a pin pressed in a groove intersecting the bore 94 between the flanges of the piston serves to limit valve unseating movement of the piston 110.

Operation of the device above described when used in conjunction with a double acting cylinder, opposite ends of which are connected to the motor ports 12 and 14 is as follows: The unit will of course normally be in the neutral position shown in Figure 2 of the drawing; and in which position flow from the pressure port 16 proceeds through recess 20 in the control member directly to the flow through port 18 without building up pressure in the valve. When the control handle is moved upwardly to its fullest extent gear segment 58 which engages rack 60 on the control member B shifts the control member to its first described position. Initial movement of the control member B towards its left-hand actuating or first position (shown in Figure 4) causes its land 114 to close off communication between the pressure port 16 and the flow through port 18 causing pressure to be built up in the valve. As the second radial drilling 28 begins to open communication with the interconnecting passageway 30, and land 42 begins to open interconnecting passageway 34, pressure is built up in both the left-hand and right-hand ends of the longitudinally extending opening 22 in the control member through the orifices 74 and 74' respectively. Pressure built up in the interconnecting passageway 30 causes the piston 110 to be forced to the right moving ball valve 100' off its seat 96' thereby permitting return flow from the control device through the interconnecting passageway 34 past land 42 to exhaust port 32. Pressure will of course have forced ball valve 100 off its seat 96, and as the flow begins to build up, a pressure differential will be created across orifice 74 decreasing the pressure exerted upon the left end of the control member B. When this flow rate develops to a predetermined rate, sufficient pressure differential will be created across the orifice 74 and in turn between the opposite ends of the control member to hold the control member B in its left-hand or first position. As the pressure differential builds up across the orifice 74 beyond that required to hold the control member in its left-hand position, the pressure differential across the ball valve 84 becomes sufficient to compress the coil spring 88 and move it off its seat 86. Ball valve 84 may be thought of as a back pressure valve set to open at a pressure differential above that required to hold the control member in its actuated position, and which thereafter opens to prevent additional pressure differential build up across the valve as the flow through the valve increases above the previously referred to predetermined rate. In those instances when the control valve is to be used for raising and lowering heavy loads, the backflow restrictor valve 116 as shown and described in application 574,327, filed March 27, 1956, may be used to limit the return rush of fluid when the interconnecting passageway 34 is opened. The backflow restrictor valve 116 is provided with a recess 118 to provide the necessary throttling effect of the returning fluid.

Figure 7:
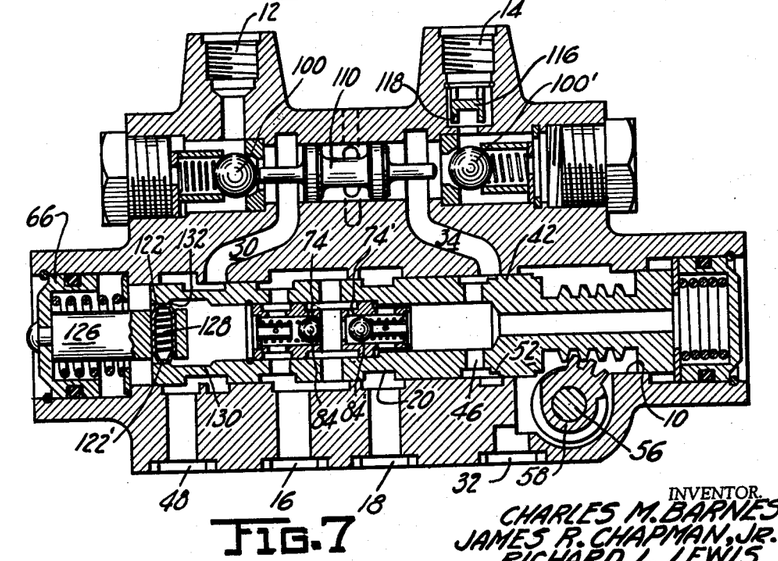
Figure 7 is a cross sectional view similar to Figure 4 but showing the valve in its fourth actuating position.

A similar operation is performed by the valve when its control handle 54 is moved downwardly, and the control member B shifted to its extreme right or fourth position (shown in Figure 7). As the control member B is moved to its right-hand position from its neutral position, land 120 separates the pressure port 16 from the flow through port 18 to cause pressure build up within the valve. Equal pressure is developed in opposite ends of the control member through orifices 74, 74', and when the third radial drilling 46 begins to communicate with the interconnecting passageway 34, pressure is built up against the right-hand end of piston 110. This pressure of course moves the piston 110 to the left to unseat ball valve 100. In this fourth position of the valve, recess 50 is positioned such that interconnecting passageway 30 is communicated with exhaust port 48. Flow therefore begins to proceed out interconnecting passageway 34 past ball valve 100' and the backflow restrictor 116 to the control double acting fluid pressure motor; and the return flow from the motor proceeds past ball valve 100 now held open by the piston 110 to the interconnecting passageway 30 and the exhaust port 48. As flow in this direction begins to increase, flow through the orifice 74' produces a difference in pressure between the left and right-hand ends of the control member B sufficient to hold the control member B in its right-hand or fourth position. This of course occurs at a substantially predetermined flow rate, and when the flow begins to exceed this rate, pressure differential across the ball valve 84' compresses its spring 88' to thereafter prevent a continuing pressure differential build up across the valve.

As previously indicated the control valve shown in the drawing is provided with second and third positions (shown in Figures 5 and 6 respectively) wherein small flows in either direction can be delivered to the control device at a rate below that at which the control member will hold itself in its actuating positions. This is accomplished in the valve shown in the drawings by means of the feathered edges or throttling grooves 40 and 52 on opposite ends of the land 42. When the control valve has been moved to its second position (shown in Figure 5) intermediate the neutral and first positions previously described, the annular recess 20 will have opened communication with respect to the interconnecting passageway 30 to provide full pressure to the control device, but the land 42 will still be in a position overlying the interconnecting passageway 34. In this second position of the land 42, however, its feathered edge or throttling groove 40 will communicate with the interconnecting passageway 34 to restrict the return flow from the control device to a rate below the predetermined rate at which flow through the orifice 74 is sufficient to hold the control member B in its actuating position. A similar throttled flow in the reverse direction is provided when the control member is in its third position (shown in Figure 6) intermediate the neutral and fourth position. In this third position, however, flow to the controlled device is throttled by means of the feathered edge or throttle groove 52, while substantially no back pressure is exerted against the control device by reason of the annular groove 50 having opened the interconnecting passageway 30. Throttling groove 52 will likewise be sized to limit the flow through orifice 74' to a rate below that at which sufficient differential pressure is provided to hold the control member B in its actuating position.

The third and fourth positions of the control valve above described permit the operator to "inch" or adjust the position of the controlled device without having the control valve go into its automatic hold condition. Operation of the device so far described is normally so smooth that the operator may not be able to detect the limits of control handle movement beyond which automatic hold is provided. In order to warn the operator that further movement of the control handle will place the control valve in its automatic hold position, warning means G is provided which requires a slight additional amount of manual effort to be delivered by the operator in order to move the control member from its second position to its first position and from its third position into its fourth position. The warning means G shown in the drawing comprises a camming device formed by a pair of tubular pistons 122 and 122′ carried in a radial drilling 124 in the end of a cylindrical boss 126 mounted on the end closure plate 66 and projecting into the left-hand end of the longitudinally extending opening 22. The tubular pistons 122 and 122′ are biased outwardly by a coil spring 128 into engagement with the side walls of the opening 22. A suitable receiving groove 130 is formed in the side wall of the opening 22 with its end shoulders 132 and 134 respectively positioned to engage the tubular pistons 122 and 122′ at control member positions demarcating its third position from its fourth position, and its second position from its first position respectively. Movement of the end shoulders 132 and 134 past the tubular pistons 122 and 122′ requires a slight additional amount of force to be exerted by the operator, in order to compress the coil spring 128 and thereafter permit the shoulders to ride past the pistons.

The control valve shown in the drawing is also believed to be unique in that it can be used in conjunction with a single acting cylinder without further modification to the valve. When used for controlling a single acting cylinder, the motor ports 12 and 14 are plugged off, the threaded plug 106′ is removed, and a connection from the cylinder inserted in place of the plug 106′. To actuate the single lift cylinder, the control member B is moved into either its third or fourth positions permitting fluid pressure to flow through interconnecting passageway 34 past ball valve 100′ to the control device. Movement of the control member B into either of its first or second positions communicates the interconnecting passageway 34 with the exhaust port 32 in the same manner as previously described; and the ball valve 100′ is held off its seat by pressure exerted against the left-hand end of the piston 110 through orifice 74, radial drilling 28, and interconnecting passageway 30. Inasmuch as the motor port 12 has been previously indicated to be plugged off, substantially no flow would pass through the orifice 74 that would provide a differential pressure to hold the control member B in its actuating position. To overcome this difficulty, a back pressure valve H has been provided between the interconnecting passageway 30 and the exhaust port 48 to establish such a flow when the valve is used in conjunction with a single lift cylinder. The back pressure valve H is formed by means of bore 136 which intersects recess 138 and interconnecting passageway 30, and which is counterbored to provide a valve seat 140 intermediate the recess and interconnecting passageway. A ball valve 142 is biased against the seat by a coil spring 144 which in turn is adjustably held in place by means of a threaded pin 146. During the times that the valve is used in conjunction with double acting cylinders, the threaded pin 146 will preferably be screwed into engagement with the ball valve 142 to hold the ball member against its seat 140. A threaded nut 148 is provided to lock the pin in any of its adjusted positions; and during the time that the valve is used in conjunction with a single acting cylinder, the pin 146 will preferably be so adjusted as to provide a back pressure within the control valve sufficient to permit the piston 110 to unseat ball valve 100′ against the pressure developed in the single acting cylinder by the load connected thereto.

While the preferred embodiment has been set forth in considerable detail, we do not wish to be limited to the particular constructions shown and described, and it is our intention to cover hereby all novel adaptations, modifications and arrangements thereof which occur to those skilled in the art to which the invention relates.

We claim:

1. A control valve comprising: a body member having a pressure port, an exhaust port and a motor port; a control member in said valve having a first position wherein no flow is experienced between said pressure and motor ports, a second position wherein a generally predetermined low flow rate is established between said pressure and motor ports, and a third position wherein full flow is established between said pressure and motor ports; a pair of opposing fluid pressure motors for holding said control member in said third position when a predetermined pressure differential is applied to said opposing motors; an orifice in the flow path through said valve for applying a pressure differential to said opposing motors, said orifice being sized to develop a lower pressure differential than said predetermined differential when said generally predetermined flow rate passes therethrough; and a back pressure valve in parallel with respect to said orifice constructed and arranged to open during flow rates through said valve above said generally predetermined flow rate; and means operatively positioned between said second and third positions of said control member and requiring a perceptible increase in force to be exerted by the operator during movement of said control member from said second position to said third position.

2. A fluid control valve comprising: a body member having a pressure port, an exhaust port, and a motor port; a control member in said valve body having a first position preventing flow from said pressure port to said motor port, a second position wherein first flow restricting means is utilized to limit the flow to said motor port below a generally predetermined limit, and a third position wherein said flow can bypass said first flow restricting means; means for holding said control member in said third position when a predetermined pressure differential is applied thereto; an orifice in the flow path between said pressure and motor ports for applying pressure differential to said holding means, said orifice being constructed to develop pressure differentials greater than said predetermined differential when said control member is in its third position, but to develop less than said predetermined differential when said control member is in its second position; and a back pressure valve bypassing said orifice and constructed and arranged to open at pressure differentials across said orifice generally above said predetermined differential; said control member also having a fourth position communicating said exhaust port with said motor port and bypassing said orifice and back pressure valve.

3. A fluid control valve comprising: a body member having a pressure port, an exhaust port and a motor port; a control member in said valve body having a first position preventing flow from said pressure port to said motor port, a second position wherein first flow restricting means is utilized to limit the flow to said motor port below a generally predetermined limit, and a third position wherein said flow can bypass said first flow restricting means; means for holding said control member in said third position when a predetermined pressure differential is applied thereto; an orifice in the flow path between said pressure and motor ports for applying pressure differential to said holding means, said orifice being constructed to develop pressure differentials greater than said predetermined differential when said control member is in its third position, but to develop less than said predetermined differential when said control member is in its second position; a back pressure valve bypassing said orifice and constructed and arranged to open at pressure differentials across said orifice generally above said predetermined differential; said control member also having a fourth position communicating said exhaust port with said motor port and bypassing said orifice and back pressure valve; and means operatively positioned between said second and third positions of said control member and requiring a perceptible increase in force to be exerted by the operator during movement of said control member from said second position to said third position.

4. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port, while also providing a second flow path between said second motor port and an exhaust port; said control member also having a neutral position wherein at least one of said flow paths is closed off, and a second position intermediate said neutral position and said first position wherein flow restricting means is utilized to limit the flow in one of said first and second flow paths to a predetermined value; means for holding said control member in said first position when a predetermined pressure differential is applied thereto; an orifice in one of said flow paths for applying pressure differential to said means, said orifice being constructed and arranged to produce less than said predetermined pressure differential when said control member is in its second position and to produce more than said predetermined pressure when said control member is in its first position; and a back pressure valve in parallel flow circuit with said orifice and constructed and arranged to open at pressure differentials across said orifice generally above said predetermined differential.

5. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port while also providing a second flow path between said second motor port and an exhaust port, said control member also having a neutral position wherein at least one of said flow paths is closed off, and a second position intermediate said neutral position and said first position wherein flow restricting means is utilized to limit the flow in one of said first and second flow paths to a predetermined value; means for holding said control member in said first position when a predetermined pressure differential is applied thereto; an orifice in one of said flow paths for applying pressure differential to said means, said orifice being constructed and arranged to produce less than said predetermined pressure differential when said control member is in its second position and to produce more than said predetermined pressure when said control member is in its first position; a back pressure valve in parallel flow circuit with said orifice and constructed and arranged to open at pressure differentials across said orifice generally above said predetermined differential; and means operatively positioned between said second and first positions of said control member and requiring a perceptible increase of force to be exerted by the operator during movement of said control member from its second position to its first position.

6. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port while also providing a second flow path between said second motor port and an exhaust port, said control member having a neutral position wherein at least one of said flow paths is closed off, and a second position intermediate said neutral position and said first position wherein flow restricting means is utilized to limit the flow in said second flow path to a predetermined rate; first and second opposing fluid pressure motor means operatively connected to said control member for holding said control member in said first position when a predetermined higher pressure is applied to said first motor than to said second motor means, an orifice in said first flow path for developing a fluid pressure differential, a first flow passage communicating pressure from the pressure port side of said orifice to said first motor means, and a second flow passage communicating pressure from the first motor port side of said orifice to said second motor means, said orifice being sized to produce less than said predetermined pressure differential when said predetermined flow rate passes therethrough as determined by said second position of said control member and to produce more than said predetermined pressure differential when said control member is in its first position.

7. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port while also providing a second flow path between said second motor port and an exhaust port, said control member having a neutral position wherein at least one of said flow paths is closed off, and a second position intermediate said neutral position and said first position wherein flow restricting means is utilized to limit the flow in said second flow path to a generally predetermined rate; first and second opposing fluid pressure motor means operatively connected to said control member for holding said control member in said first position when a predetermined higher pressure is applied to said first motor means than to said second motor means; an orifice in said first flow path for developing pressure differential, a first flow passage communicating pressure from the pressure port side of said orifice to said first motor means, and a second flow passage communicating pressure from the first motor port side of said orifice to said second motor means, said orifice being sized to produce less than said predetermined pressure differential when said predetermined rate passes therethrough as determined by said second position of said control member and to produce more than said predetermined pressure differential when said control member is in its first position; and means operatively positioned between said second and first positions of said control member and requiring a perceptible increase of force to be exerted by the operator during movement of said control member from its second position to its first position.

8. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port while also providing a second flow path between said second motor port and an exhaust port, said control member having a neutral position wherein at least one of said flow paths is closed off, and a second position intermediate said neutral position and said first position wherein flow restricting means is utilized to limit the flow in said second flow path to a predetermined value; means for holding said control member in said first position when a predetermined pressure is applied thereto; an orifice in said first flow path for applying pressure differential to said means, said orifice being constructed and arranged to produce less than said predetermined pressure differential when said control member is in its second position and to produce more than said predetermined pressure differential when said control member is in its first position; and a back pressure valve in parallel flow circuit with said orifice and constructed and arranged to open at pressure differentials across said orifice generally above said predetermined differential.

9. A fluid control valve adapted to control a double acting fluid pressure motor comprising: a body member having a pressure port, at least one exhaust port, and first and second motor ports; a control member constructed and arranged when in a first position to provide a first flow path between said pressure port and said first motor port while also providing a second flow path between said second motor port and an exhaust port, said control member having a neutral position wherein at least one of said flow paths is closed off, and a second position intermediate said neutral position and said first position wherein flow restricting means is utilized to limit the flow in said second flow path to a predetermined value; means for holding said control member in said first position when a predetermined pressure is applied thereto; an orifice in said first flow path for applying pressure differential to said means, said orifice being constructed and arranged to produce less than said predetermined pressure differential when said control member is in its second position and to produce more than said predetermined pressure differential when said control member is in its first position; a back pressure valve in parallel flow circuit with said orifice and constructed and arranged to open at pressure differentials across said orifice generally above said predetermined differential; and means operatively positioned between said second and first positions of said control member and requiring a perceptible increase of force to be exerted by the operator during movement of said control member from its second position to its first position.

10. A fluid control valve adapted to control a double acting fluid pressure motor comprising: a body member having a longitudinal chamber to which a pressure port, at least one exhaust port, and first and second motor ports communicate; a control member in said chamber slidable between first, second, intermediate, third and fourth positions and having a longitudinally extending opening therein communicating its opposite ends; a first passage means in said control member communicating said pressure port with said longitudinally extending opening; a pair of orifices in said opening, respective ones of which are positioned on respective sides of said first passage means to divide said opening into first and second end portions; means biasing said control member to its intermediate position and which means is overcome by a predetermined pressure differential in said first and second end portions of said control member, said control member having second passage means which in its first and second positions communicate said first end portion of its longitudinal opening to said first motor port while also communicating said second motor port to an exhaust port, and having third passage means which in its third and fourth positions communicate said second end portion of its longitudinal opening to said second motor port while also communicating said first motor port to an exhaust port; and flow restricting means which in said second and third positions of said control member restricts flow through said valve below a generally predetermined rate, said orifice being sized to develop less than said predetermined pressure differential when passing said predetermined flow rate, and said control member having sufficient capacity in its first and fourth positions to produce flows through said orifices above the rate producing said predetermined differential pressure.

11. A fluid control valve adapted to control a double acting fluid pressure motor comprising: a body member having a longitudinal chamber to which a pressure port, at least one exhaust port, and first and second motor ports communicate; a control member in said chamber slidable between first, second, intermediate, third and fourth positions and having a longitudinally extending opening therein communicating its opposite ends; a first passage means in said control member communicating said pressure port with said longitudinally extending opening; a pair of orifices in said opening, respective ones of which are positioned on respective sides of said first passage means to divide said opening into first and second end portions; means biasing said control member to its intermediate position and which means is overcome by a predetermined pressure differential in said first and second end portions of said control member, said control member having second passage means which in its first and second positions communicate said first end portion of its longitudinal opening to said first motor port while also communicating said second motor port to an exhaust port, and having third passage means which in its third and fourth positions communicate said second end portion of its longitudinal opening to said second motor port while also communicating said first motor port to an exhaust port; flow restricting means which in said second and third positions of said control member restricts flow through said valve below a generally predetermined rate, said orifice being sized to develop less than said predetermined pressure differential when passing said predetermined flow rate, and said control member having sufficient capacity in its first and fourth positions to produce flows through said orifices above the rate producing said predetermined differential pressure; and means requiring a perceptible increase in force to move said control member from said second position to said first position and from said third position to said fourth position.

12. A fluid control valve adapted to control a double acting fluid pressure motor comprising: a body member having a longitudinal chamber to which a pressure port, at least one exhaust port, and first and second motor ports communicate; a control member in said chamber slidable between first, second, intermediate, third and fourth positions and having a longitudinally extending opening therein communicating its opposite ends; a first passage means in said control member communicating said pressure port with said longitudinally extending opening; a pair of orifices in said opening, respective ones of which are positioned on respective sides of said first passage means to divide said opening into first and second end portions; means biasing said control member to its intermediate position and which means is overcome by a predetermined pressure differential in said first and second end portions of said control member, said control member having second passage means which in its first and second positions communicate said first end portion of its longitudinal opening to said first motor port while also communicating said second motor port to an exhaust port, and having third passage means which in its third and fourth positions communicate said second end portion of its longitudinal opening to said second motor port while also communicating said first motor port to an exhaust port; flow restricting means which in said second and third positions of said control member restricts flow through said valve below a generally predetermined rate, said orifice being sized to develop less than said predetermined pressure differential when passing said predetermined flow rate, and said control member having sufficient capacity in its first and fourth positions to produce flows through said orifices above the rate producing said predetermined differential pressure, and a pair of back pressure valves respective ones of which are in parallel with respective ones of said orifices to resist flow from said pressure port, said back pressure valves being set to open at differential pressures above said generally predetermined differential pressure.

13. A fluid control valve adapted to control a double acting fluid pressure motor comprising: a body member having a longitudinal chamber to which a pressure port, at least one exhaust port, and first and second motor ports communicate; a control member in said chamber slidable between first, second, intermediate, third and fourth positions and having a longitudinally extending opening therein communicating its opposite ends; a first passage means in said control member communicating said pressure port with said longitudinally extending opening; a pair of back pressure valves in said opening positioned on respective sides of said first passage means to divide said opening into first and second end portions; a pair of orifices respective members of which bypass said back pressure valves; means biasing said control member to its intermediate position and which means is overcome by a predetermined pressure differential in said first and second end portions of said control member, said control member having second passage means which in its first and second positions communicate said first end portion of its longitudinal opening to said first motor port while also communicating said second motor port to an exhaust port, and having third passage means which in its third and fourth positions communicate said second end portion of its longitudinal opening to said second motor port while also communicating said first motor port to an exhaust port, flow restricting means which in said second and third positions of said control member restricts flow through said valve below a predetermined rate which produces said predetermined pressure differential across said orifices, said control member having sufficient capacity in its first and fourth positions to produce flows through said orifices above the rate producing said predetermined differential pressure, said back pressure valves being adapted to open at flow rates above said predetermined rate; and means requiring a perceptible increase in force to move said control member from said second position to said first position and from said third position to said fourth position.

14. In a control valve: a valve body, a fluid inlet port in said valve body, a fluid outlet port in said valve body, said valve body having first flow passage means therein for conducting flow from said inlet port to said outlet port, valve means in said flow passage means for controlling flow therethrough, said valve means having a movable control member which when in one position closes said valve means and which in a second position opens said valve means, first and second opposing fluid pressure chambers operatively arranged with respect to said control member to hold said control member in said second position when the pressure in said first opposing chamber exceeds the pressure in said second opposing chamber by a predetermined amount, a back pressure valve of relatively large flow capacity in said flow passage means for creating a differential pressure between said inlet and outlet ports which is greater than said predetermined pressure differential, second passage means communicating the inlet port side of said back pressure valve to said first opposing chamber, third passage means communicating the outlet port side of said back pressure valve to said second opposing chamber, and continually open fourth passage means in parallel flow relationship with respect to said back pressure valve, said fourth passage means having a flow capacity which produces said predetermined pressure differential at a flow rate considerably below the flow capacity of said back pressure valve.

15. In a control valve: a valve body, a fluid inlet port in said valve body, a fluid outlet port in said valve body, said valve body having first flow passage means therein for conducting flow from said inlet port to said outlet port, valve means in said flow passage means for controlling flow therethrough, said valve means having a movable control member which when in one position closes said valve means which in a second position opens said valve means and which in a third position causes said valve means to limit flow therethrough at a generally predetermined rate, first and second opposing fluid pressure chambers operatively arranged with respect to said control member to hold said control member in said second position when the pressure in said first opposing chamber exceeds the pressure in said second opposing chamber by a predetermined amount, a back pressure valve of relatively large flow capacity in said flow passage means for creating a differential pressure between said inlet and outlet ports which is greater than said predetermined pressure differential, second passage means communicating the inlet port side of said back pressure valve to said first opposing chamber, third passage means communicating the outlet port side of said back pressure valve to said second opposing chamber, and continually open fourth passage means in parallel flow relationship with respect to said back pressure valve, said fourth passage means having a flow capacity below that of said generally predetermined rate produced when said valve is in said third position.

16. A control valve which may be used to control either a double acting or single acting cylinder and comprising: a body member having a pressure port, at least one exhaust port, and first and second motor ports; a control member having a first position wherein it provides a first flow path between said pressure port and said first motor port while also providing a second flow path between said second motor port and an exhaust port, a second position wherein it provides a third flow path between said pressure port and said second motor port while also providing a fourth flow path between said first motor port and an exhaust port, and an intermediate position wherein at least one of said flow paths is closed off; first and second opposing fluid pressure motor means for holding said control member in said first position when a predetermined higher pressure is applied to said first motor than to said second motor means, pressure drop creating means in said first flow path the upstream side of which is communicated to said first motor means and the downstream side of which is communicated to said second motor means; a lockout valve structure for preventing return flow through said second flow path, said lockout valve structure having opening means communicating with said first flow path and which opens said lockout valve when subjected to pressure from said first flow path; and a relief valve communicating with the downstream side of said pressure drop creating means for permitting sufficient flow through said pressure drop creating means to hold said valve in said first position; and whereby the valve will hold itself in said first position even though said first motor port is plugged off.

17. A control valve which may be used to control either a double acting or single acting cylinder and comprising: a body member having a pressure port, at least one exhaust port, and first and second motor ports; a control member having a first position wherein it provides a first flow path between said pressure port and said first motor port while also providing a second flow path between said second motor port and an exhaust port, an off position wherein at least one of said flow paths is closed off, and an intermediate second position wherein a flow restriction is inserted into said second flow path to restrict return flow through said valve to a generally predetermined value; first and second opposing fluid pressure motor means for holding said control member in said first position when a predetermined higher pressure is applied to said first motor than to said second motor means, an orifice in said first flow path the upstream side of which is communicated to said first motor means and the downstream side of which is communicated to said second motor means, said orifice producing a pressure drop below that required to hold said control member in its first position when flow through said valve is limited by said flow restriction that is brought into operation by said second valve position; a back pressure valve in parallel with said orifice and set to open at a pressure differential above that required to hold said control member in said first position; a lockout valve structure for preventing return flow through said second flow path, said lockout valve structure having opening means communicating with said first flow path and which opens said lockout valve when subjected to pressure from said first flow path; a relief valve communicating with the downstream side of said pressure drop creating means for permitting sufficient flow through said pressure drop creating means to hold said valve in said first position; and means providing increased resistance to movement of said control member from said second position to said first position than is provided to movement from said off position to said intermediate second position; whereby the valve can be controlled either manually or with automatic hold when used to control either a double acting or single acting cylinder.

References Cited in the file of this patent

UNITED STATES PATENTS

| | | |
|---|---|---|
| 1,588,656 | Christensen | June 15, 1926 |
| 1,905,132 | Bishop | Apr. 25, 1933 |
| 2,448,532 | Kirkham | Sept. 7, 1948 |
| 2,448,557 | Stephens | Sept. 7, 1948 |
| 2,483,312 | Clay | Sept. 27, 1949 |
| 2,532,552 | Jirsa | Dec. 5, 1950 |
| 2,691,964 | Stickney | Oct. 19, 1954 |
| 2,708,909 | Curlett | May 24, 1955 |

FOREIGN PATENTS

| | | |
|---|---|---|
| 576,684 | Great Britain | Feb. 1, 1946 |